(12) United States Patent
Will et al.

(10) Patent No.: US 7,158,707 B2
(45) Date of Patent: Jan. 2, 2007

(54) SOLID CORE OPTIC FIBER AND METHOD FOR THE PRODUCTION THEREOF

(75) Inventors: Nadja Will, Neustadt (DE); Holger Will, Neustadt (DE); Joachim Schuchmann, Effelder (DE); Swen Tischer, Neustadt (DE)

(73) Assignee: CCS Technology, Inc, Wilmington, DE (US)

( * ) Notice: Subject to any disclaimer, the term of this patent is extended or adjusted under 35 U.S.C. 154(b) by 136 days.

(21) Appl. No.: 10/498,474

(22) PCT Filed: Dec. 9, 2002

(86) PCT No.: PCT/DE02/04510

§ 371 (c)(1),
(2), (4) Date: Jun. 10, 2004

(87) PCT Pub. No.: WO03/054594

PCT Pub. Date: Jul. 3, 2003

(65) Prior Publication Data

US 2005/0036753 A1 Feb. 17, 2005

(30) Foreign Application Priority Data

Dec. 12, 2001 (DE) ................. 101 61 045

(51) Int. Cl.
*G02B 6/02* (2006.01)
*G02B 6/36* (2006.01)
*G02B 6/44* (2006.01)

(52) U.S. Cl. ..................... 385/128; 385/107
(58) Field of Classification Search ............... 385/100, 385/102, 107, 123, 128
See application file for complete search history.

(56) References Cited

U.S. PATENT DOCUMENTS

| 4,331,378 | A | | 5/1982 | Hartig | 385/108 |
|---|---|---|---|---|---|
| 4,472,021 | A | | 9/1984 | Ansel et al. | 385/141 |
| 5,062,685 | A | * | 11/1991 | Cain et al. | 385/114 |
| 5,838,862 | A | | 11/1998 | Chien | 385/102 |
| 5,925,462 | A | * | 7/1999 | Girgis | 428/392 |
| 6,026,208 | A | | 2/2000 | Will et al. | 385/128 |
| 6,487,345 | B1 | * | 11/2002 | Dixon et al. | 385/100 |
| 6,516,126 | B1 | | 2/2003 | Rous et al. | 385/128 |

FOREIGN PATENT DOCUMENTS

JP        59031903 A * 2/1984

* cited by examiner

*Primary Examiner*—Sung Pak
*Assistant Examiner*—Daniel Petkovsek

(57) ABSTRACT

An optical insulated core with a coated optical fiber (2) shows a core jacket (4) with a core jacket material containing polyvinylchloride (41) which is applied to the coating of the optical fiber. It contains a solid component (42) distributed within the core jacket material, which produces a mechanical separation effect against the coating of the optical fiber. The solid component (42) is mixed and distributed into the core jacket material during a compounding process. Thus the core jacket can be removed from the coating of the optical fiber in a simple way.

6 Claims, 1 Drawing Sheet

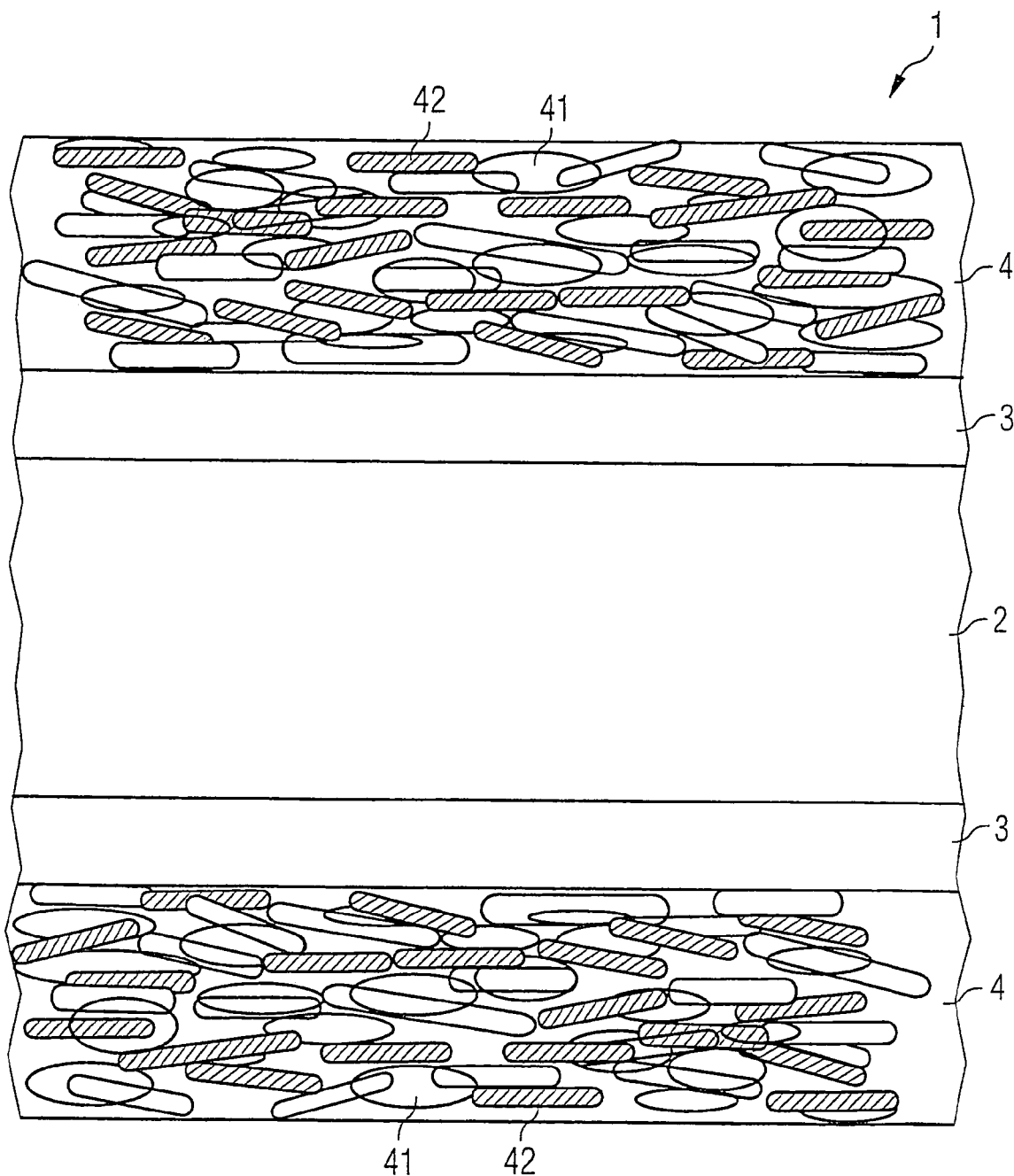

SOLID CORE OPTIC FIBER AND METHOD FOR THE PRODUCTION THEREOF

FIELD OF THE INVENTION

The present invention concerns an optical insulated core as well as a process for the manufacture of such an optical insulated core.

BACKGROUND OF THE INVENTION

In order to keep optical fibers in the form of optical glass fibers free from outside influences, optical fibers are generally protected by a jacket. A simple possibility to protect optical fibers in the form of glass fibers against outside influences consists of providing the optical fiber with a coating and immediately applying a firm protective jacket made of a suitable plastic over the coating of the optical fiber. Such an arrangement is commonly designated as an insulated core or filled core. Such a core construction distinguishes itself by a substantial decrease of the outer diameter of the core in contrast to a loose tube.

Especially for the installation and connectorization it is necessary to remove the core jacket of an insulated core from the optical fiber. To make it easier to remove a PVC core jacket, which contains polyvinylchloride, from the coating of an optical fiber, it is usual to place a Teflon layer (so-called TB-2 coating) between the core jacket and the coating of the optical fiber as a separating layer. Thus a user can strip the core jacket of an insulated core over a greater length in one step.

An optical insulated core thus constructed has, however, certain disadvantages. An optical insulated core with a TB-2 layer is comparatively more expensive to produce, especially the application of the different layers is comparatively costly. During application of the layers in one work process, the danger exists for an uneven layer thickness and formation of kinks in the Teflon due to abrasion in the extruder tool. Additionally, due to voids where there is no Teflon, localized attenuation peaks can occur. Furthermore, generally only a limited pay-off speed is possible during the extrusion process. With a 2-step extrusion process, where the Teflon layer is applied first followed by the PVC core jacket, additional investment costs are incurred due to the necessary expansion of the extrusion lines. Handling problems can also be created, since the Teflon layer is commonly formed as a 3-component mixture and the components contain hazardous elements.

SUMMARY OF THE INVENTION

It is the objective of the present invention, to specify an optical insulated core, where the core jacket can be removed comparatively easily from the coating of the optical fiber while avoiding the disadvantages listed above.

Additionally, it is the objective of the present invention, to specify a process for the manufacture of such an optical insulated core.

The objective of the optical insulated core is achieved with an optical insulated core according to patent claim 1. The objective of the process for the manufacture of an optical insulated core is achieved with a process for the manufacture of an optical insulated core according to patent claim 9.

The optical insulated core according to the invention has a core jacket with a core jacket material containing polyvinylchloride, which contains a solid distributed in the core jacket material, which produces a mechanical separation effect against the coating of the optical fiber. The manufacture of the optical insulated core occurs in such a way, that the solid component producing the separation effect is mixed and distributed into the matrix material forming the core jacket and containing polyvinylchloride by means of a compounding process.

This results in the advantage, that the manufacturing costs compared to a core construction with a Teflon separating layer are significantly reduced, because the comparatively expensive Teflon is eliminated, the investment costs are minimized due to the one-step process and the time necessary for manufacture of the insulated core is decreased. For manufacture of the insulated core according to the invention only one extrusion line and one extrusion process are necessary. In comparison to the manufacture of an insulated core with a Teflon layer, the extrusion speed during application of the PVC core jacket onto the coated optical fiber can be significantly increased, for example from a speed of 140 m/min for manufacture of an insulated core with a Teflon layer to a speed greater than 300 m/min for the manufacture of an insulated core according to the invention.

The provision of the solid component does not affect the total physical characteristic profile of the PVC core jacket, since especially the stability and temperature behavior of the PVC core jacket are not affected. Thus localized attenuation characteristics of the insulated core according to the invention are not affected due to the provision of the solid component. Thus the physical and optical characteristics profile of the insulated core are not negatively affected in the core construction according to the invention.

In an advantageous construction sample of the invention, a silicone elastomer is mixed into the core jacket material as a solid component. This is mixed into the matrix material of the core jacket during a compounding process, so that the solid component in the form of the silicone elastomer is distributed in a statistically homogenous way in the core jacket material.

BRIEF DESCRIPTION OF THE DRAWING FIGURES

FIG. 1 shows a cross sectional view of the fiber optic cable of the present invention.

DETAILED DESCRIPTION OF THE INVENTION

In a preferred construction sample of the invention a high molecular polysiloxane formulation is mixed into the core jacket material. This formulation has a molecular chain length greater than approximately 100,000 polymerized monomers. It was especially advantageous to mix HTV silicone rubber (high temperature-vulcanized silicone rubber) based on polydimethylvinyl-siloxane into the core jacket material.

In a further construction sample of the invention, a component is mixed into the core jacket material, which shows an aversion to or incompatibility with the coating of the optical fiber due to its chemical composition and thus produces the separating effect against the coating of the optical fiber. Such a component can, for example, be chlorinated polyethylene (CPE).

In a further construction sample of the invention a mineral lubricant or separation element, especially in the form of a high-dispersion silicone dioxide (Sipemat 44) or a talcum product is mixed into the core jacket material as a filling compound element.

In another advantageous construction sample of the invention, a wax-like separation element, especially fatty acid esters, is mixed into the core jacket material.

Further advantageous constructions and developments of the invention are given in the sub-claims.

In the following, the invention is explained in more detail by means of the diagrams in the figures, which shows a construction form of an insulated core according to the invention.

The figure shows a longitudinal section of an optical insulated core 1, which contains an optical fiber in the form of an optical glass fiber 2. The glass fiber 2 is coated all-around with an acrylic coating 3. The core jacket 4, which encloses the optical insulated core towards the outside is applied to the coating 3. The core jacket 4 is formed by a PVC insulation compound, where the polyvinylchlorides contained in the core jacket material are designated with the reference character 41. Additionally, an non-soluble solid component 42 is contained in the core jacket material of the core jacket, which is mixed in by a compounding process during manufacture of the insulated core in such a way, that it is statistically distributed in a homogenous way within the core jacket material. The solid component 42 in the form of a high-molecular polysiloxane formulation produces a mechanical separation effect against the acrylic coating 3 of the optical fiber 2.

By providing the solid component 42, the ability to remove the core jacket 4 from the coating 3 of the optical fiber 2 can be noticeably improved. It is advantageous that the physical and optical characteristics profile of the insulated core 1 are not negatively influenced due to the high-molecular polysiloxane. In addition, the total characteristics profile of the PVC core jacket is not affected, especially in regard to stability and temperature behavior. In order to avoid negative localized attenuation increases due to the polysiloxane, the polysiloxane is highly molecular in such a way, that it does not migrate into the layer 4.

In a further construction sample of the invention a solid component 42 is mixed into the core jacket material of the core jacket 4, which shows an aversion to the acrylic coating 3 of the optical fiber 2 due to its chemical composition. Such a component is especially formed by chlorination of polyethylene.

The invention claimed is:

1. An optical insulated cable with an optical fiber, which includes a coating, and a cable jacket, the cable jacket material including polyvinylchloride, which is applied to the coating of the optical fiber, and which includes a silicone elastomer as a solid component distributed with the cable jacket material, that produces a mechanical separation effect against the coating of the optical fiber, wherein the solid component of the cable jacket material includes a HTV silicone rubber based on polydimethylvinylsiloxane having a molecular chain length greater than approximately 100,000 polymerized monomers.

2. The optical insulated cable according to claim 1, wherein the cable jacket material includes a component having an aversion to the coating of the optical fiber due to its chemical composition.

3. The optical insulated cable according to claim 2, wherein the cable jacket material includes a chlorinated polyethylene.

4. The optical insulated cable according to claim 1, wherein the cable jacket material includes a mineral lubricant or separating component.

5. The optical insulated cable according to claim 1, wherein the jacket cable material includes a wax-like separating material.

6. A process for the manufacture of an optical insulated cable with an optical fiber which has a coating, where a silicone elastomer as a solid component, which produces a mechanical separation effect against the coating of the optical fiber, is mixed and distributed during a compounding process into matrix material forming a solid component of the cable jacket that includes polyvinylchloride and a HTV silicone rubber based on polydimethylvinylsiloxane having a molecular chain length greater than approximately 100,000 polymerized monomers.

* * * * *